Dec. 26, 1967     E. HARVITH     3,360,132

COFFEE FILTER ELEMENT

Original Filed Oct. 19, 1966

INVENTOR
ERWIN HARVITH

BY
Hauke, Knass, & Gifford
ATTORNEYS

United States Patent Office 3,360,132
Patented Dec. 26, 1967

3,360,132
COFFEE FILTER ELEMENT
Erwin Harvith, Southfield, Mich., assignor to Star Filter Company, Detroit, Mich., a corporation of Michigan
Original application Oct. 19, 1966, Ser. No. 586,264, now Patent No. 3,343,682, dated Sept. 26, 1967. Divided and this application June 5, 1967, Ser. No. 643,235
5 Claims. (Cl. 210—477)

ABSTRACT OF THE DISCLOSURE

A coffee filter for insertion in a basket of perforated cup of coffee-making apparatus including a central accurate slit to permit the filter to be inserted over the central stem of a percolator or to lie flat on the bottom of the basket when used in a dripulator and in which the filter also includes a peripheral tear strip so that it will accommodate different sizes of baskets.

---

The present application is a divisional application of Ser. No. 586,264 filed Oct. 19, 1966, now Patent No. 3,343,682, which in turn was a continuation-in-part application of copending but now abandoned application Ser. No. 300,947 filed Aug. 8, 1963.

Coffee making apparatus normally comprises a perforated cup or basket in which a filter element is placed. Ground coffee beans are disposed in the basket on top of the filter element and means provided to cause heated water to spill over onto the coffee. As the water trickles through the loose coffee grounds, it absorbs the flavor and strength of the coffee beans. The filter element is normally formed of a paper or tissue material adapted to remove the fine grounds or dregs which would normally pass through the perforations in the ground coffee containing basket in the absence of the filter.

A problem associated with conventional coffee filters is that coffee percolators in common usage, depending on their capacity, normally employ a variety of sizes of coffee baskets. Thus, the retailer is required to maintain an inventory of coffee filters to accommodate different sizes of percolators. In addition, a consumer having coffee percolators of two different sizes is required to maintain a stock of two different sizes of coffee filters.

It is the broad purpose of the present invention to provide a coffee filter sheet which may be adapted to accommodate any standard size coffee ground basket. In a preferred embodiment of the present invention, which will be subsequently described in detail, the filter sheet is formed of filter material and provided with a series of circular patterns having a common diameter with each pattern corresponding to a standard size coffee basket. Each circular pattern is defined by a series of incisions formed in the filter material and adapted to permit separation of the circumferential edge of the filter sheet so that the diameter of the element is reduced to the desired size. Thus, one size filter sheet can be adapted to accommodate any standard size ground coffee basket thereby reducing the varieties of sizes of coffee filters which must be maintained by the retailer and the consumer.

There are two different types of coffee making apparatus in common usage, including the percolator type which employs a perforated basket having a hollow stem extending therethrough for the delivery of heated water which spills over the ground coffee. A second type of coffee maker is the dripulator, which employs a perforated basket and means for pouring the water over the ground coffee without utilizing a hollow stem.

It is another purpose of the present invention to provide a single filter which in addition to accommodating any standard size of coffee basket can be used with either of the above common type coffee makers. The preferred embodiment of the invention employs a centrally disposed incision which will permit a stem to be slipped therethrough or remain seated in the plane of the filter if a stem is not utilized. Preferably the centrally disposed incision takes the form of an arcuate incision having a diameter closely corresponding to the diameter of the stem so that when the filter element is slipped over the stem, the filter forms a snug fit thus preventing the grounds from slipping through with the dripping water. Another form of the centrally disposed slit to accommodate the hollow stem takes the form of a pair of mutually perpendicular incisions, which permit the filter to be inserted over the end of the stem. Although the perpendicular incisions are of a more conventional configuration, the arcuate incision provides special advantages over the conventional configuration in that there is little tendency for the incision to tear radially outwardly; thus, enlarging the central opening and permitting the grounds to slip through around the hollow stem.

It is therefore an object of the present invention to provide a single size filter sheet which is provided with a plurality of circular patterns perforated to permit the filter sheet to be reduced to a size corresponding to the diameter of any standard coffee ground basket.

It is another object of the present invention to provide such a filter having an extremely simple design and low manufacturing costs.

It is still another object of the present invention to provide such a filter which may be utilized in coffee making apparatus employing a basket either with or without a centrally disposed hollow stem extending therethrough.

Still, other objects and advantages of the present invention will be fully apparent from the following detailed description wherein the preferred embodiment of the invention is set forth. The invention makes reference to the accompanying drawings in which.

Figure 1:
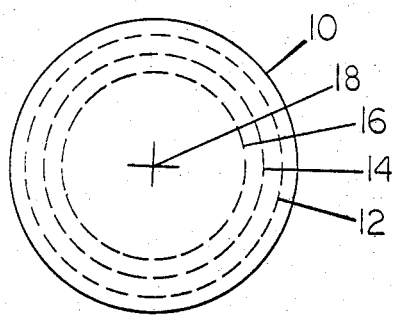
FIG. 1 is a plan view of the preferred filter element embodying the invention.
Figure 2:
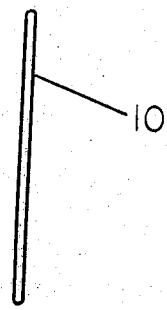
FIG. 2 is a side elevation view of the element illustrated in FIG. 1.

Now referring to the drawings, FIGS. 1 and 2 illustrate a preferred embodiment of the present invention as comprising a filter sheet 10 formed of conventional filter material, such as tissue. The filter sheet 10 preferably has a circular configuration and includes three circular patterns 12, 14, and 16; each having a decreasing diameter and formed about a common center. Each of the patterns is preferably defined by a series of spaced incisions to form a circumferential tear strip. Preferably each of the patterns correspond to the diameter of conventional coffee filter basket. Thus, for instance, pattern 16 might have a diameter of three inches, pattern 14, a diameter of three and one half inches, and pattern 12, a diameter of four inches, and the overall diameter of the filter sheet having a magnitude of four and one half inches.

As can best be seen in FIG. 2, the filter sheet 10 is adapted to accommodate a selected basket size by tearing the peripheral edge of the filter sheet along a pattern size corresponding to the selected basket. It is to be understood, of course, that the incisions of the unseparated patterns are such that they do not permit the coffee grounds to trickle through but perform a full filtering function.

Figure 3:
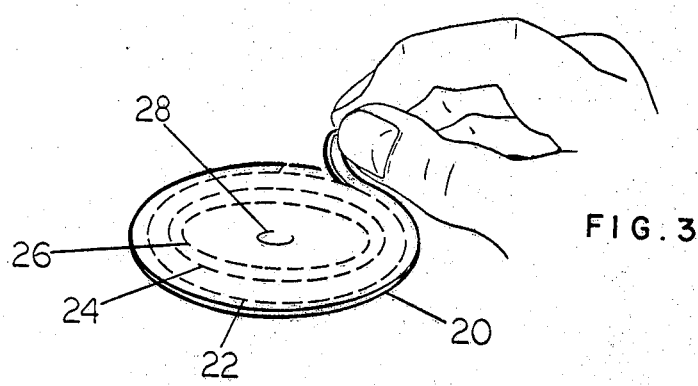
FIG. 3 is a perspective view of the element illustrated in FIG. 1 and showing how the element may be reduced to a select size.

It will be noted that in FIG. 1, the element 10 is provided with a pair of centrally disposed, narrow, perpendicular slits 18. FIG. 3 illustrates an alternative embodiment of the invention including a filter element 20 having circular patterns 22, 24, and 26. This embodiment differs from that shown in FIG. 1 in that a centrally disposed arcuate slit 28 is employed. The slit 28 is preferably formed through about 300° of a circle and the remaining 60° is left unformed. When used with a dripulator, the tab thus formed remains seated to form a unitary part of the filter.

Figure 4:
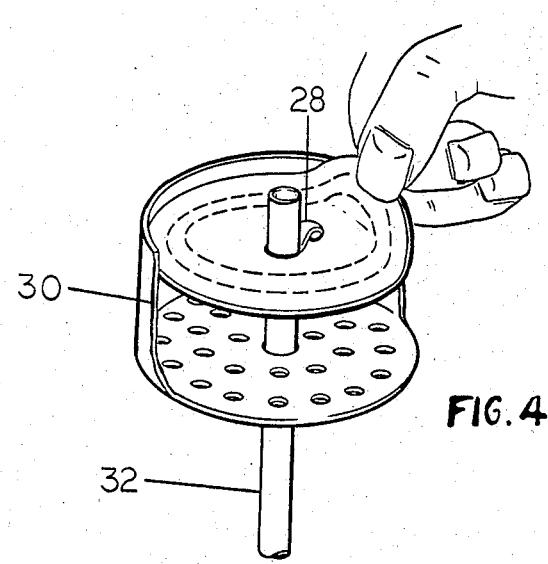
FIG. 4 is a perspective view of the element of the reduced element being inserted in the basket of a coffee brewing apparatus.

FIG. 4 illustrates a basket 30 employed in a perpendicular-type coffee making apparatus which utilizes a hollow vertical stem 32 extending upwardly through the basket to direct heated water which is delivered over the grounds contained within the basket. The filter element 20 illustrated in FIG. 2 has its size reduced by removing the circumferential edge so that its diameter corresponds to the interior diameter of the basket 30. The filter element is then pushed over the upper end of the stem 24, so that the flap of the arcuate incision 28 forms a circular opening. The filter is pushed downwardly along the stem 24 until it overlays the horizontal perforated bottom of the basket 30. The ground coffee beans are then placed in the basket over the filter and the coffee brewed in the conventional manner. After brewing, the filter is discarded with the coffee grounds.

Since the filter 10 fits closely about the sides of the hollow stem 32, the coffee grounds are prevented from passing through.

Having thus described my invention, I claim:

1. A filter element adapted for use with ground coffee holding baskets of different sizes, said filter element comprising:
   (a) a circular planar section of a fluid pervious material;
   (b) a circular pattern defined in said planar section formed by a series of arcuate incisions forming a circular line of separation adjacent the outer periphery thereof and corresponding to the lower portion of the ground coffee holding basket so that the perimetric edge of said planar section may be separated along said weakened line of separation to form a circular body section to accommodate the ground coffee holding basket.

2. A filter element as defined in claim 1 including a second circular pattern defined by a weakened line of separation and corresponding to the lower portion of another ground coffee holding basket, and said first and second circular patterns having diameters with different magnitude and having a space therebetween greater than the space between the arcuate incisions forming said lines of separation.

3. A filter element as defined in claim 1, including an arcuate incision centrally formed in said section, said central arcuate incision having a generally semi-circular configuration with all points parallel to said circular patterns so that said filter element may be laid in a coffee perculator having a tubular section extending through the central arcuate incision so that the edges of the central arcuate incision intimately contact the outer surface of the tubular section.

4. A filter element as defined in claim 1, including a centrally disposed incision adapted to allow said filter element to be placed about the central stem of a coffee maker.

5. A filter device as defined in claim 1, including a pair of mutually perpendicular centrally disposed incisions having a length slightly exceeding the diameter of a central stem in a coffee maker and adapted to allow said filter element to be placed about said central stem in the bottom of said ground coffee basket.

References Cited

UNITED STATES PATENTS

| | | | |
|---|---|---|---|
| 2,948,212 | 8/1960 | Sisselman et al. | 99—310 |
| 3,250,398 | 5/1966 | Adiletta | 210—477 |

REUBEN FRIEDMAN, *Primary Examiner.*

C. DITLOW, *Assistant Examiner.*